United States Patent
Ho et al.

(10) Patent No.: US 10,754,398 B2
(45) Date of Patent: Aug. 25, 2020

(54) ADAPTIVE COOLING TECHNIQUES IN ELECTRONIC DEVICES

(71) Applicant: Microsoft Technology Licensing, LLC, Redmond, WA (US)

(72) Inventors: Chau Van Ho, Des Moines, WA (US); Bo Dan, Redmond, WA (US); Spencer B. Eggert, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 15/160,893

(22) Filed: May 20, 2016

(65) Prior Publication Data

US 2017/0336839 A1    Nov. 23, 2017

(51) Int. Cl.
*G06F 1/20* (2006.01)
*G05B 19/406* (2006.01)

(52) U.S. Cl.
CPC ........... *G06F 1/206* (2013.01); *G05B 19/406* (2013.01); *G06F 1/20* (2013.01); *G05B 2219/49216* (2013.01)

(58) Field of Classification Search
CPC ......... G06F 1/206; G06F 1/20; G05B 19/406; G05B 2219/49216
USPC ....................................................... 700/300
See application file for complete search history.

(56) References Cited

U.S. PATENT DOCUMENTS 6,643,128 B2    11/2003  Chu et al.
6,725,680 B1 *   4/2004  Schenk ................... F25D 11/02
                                                            62/186
8,214,086 B2     7/2012  Thompson et al.
8,423,200 B2     4/2013  Chang
8,515,095 B2     8/2013  Bard
8,560,132 B2    10/2013  Matteson
8,768,530 B2     7/2014  Liang et al.
8,768,532 B2     7/2014  Rubenstein (Continued)

OTHER PUBLICATIONS

Kumar, Sanjeev, "PSoC® 1—Intelligent Fan Controller", Retrieved on: Dec. 7, 2015 Available at: http://www.cypress.com/file/124721/download.

(Continued)

*Primary Examiner* — James J Lee
*Assistant Examiner* — Michael W Choi
(74) *Attorney, Agent, or Firm* — Ray Quinney & Nebeker P.C.; Paul N. Taylor

(57) ABSTRACT

Cooling of a computing device is described herein. The computing device includes a plurality of fans, a plurality of sensors, and a processor in communication with the plurality of fans and the plurality of sensors. Each sensor of the plurality of sensors is associated with at least one fan of the plurality of fans and is operable to determine a temperature. The processor is configured to determine, for each sensor of the plurality of sensors, a difference between the determined temperature and a predetermined temperature corresponding to the sensor. The processor is also configured to compared the determined differences. The processor is configured to increase a speed of at least a first fan of the plurality of fans based on the comparison, and determine which fan of the plurality of fans to decrease fan speed based on the increased speed of the first fan.

19 Claims, 4 Drawing Sheets

(56) References Cited

U.S. PATENT DOCUMENTS

| | | | |
|---|---|---|---|
| 2005/0240316 A1* | 10/2005 | Mayer | H05K 7/20209 700/300 |
| 2006/0054713 A1 | 3/2006 | Wang et al. | |
| 2009/0092261 A1* | 4/2009 | Bard | G06F 1/206 381/71.1 |
| 2009/0304199 A1* | 12/2009 | DeMoss | G06F 1/20 381/71.1 |
| 2012/0218707 A1* | 8/2012 | Chan | H05K 7/20518 361/679.48 |
| 2012/0224322 A1 | 9/2012 | Artman et al. | |
| 2012/0229710 A1* | 9/2012 | Okazawa | H04N 9/3144 348/748 |
| 2013/0131886 A1* | 5/2013 | Nitta | H05K 7/20209 700/300 |
| 2013/0294029 A1 | 11/2013 | Guo et al. | |
| 2013/0333871 A1 | 12/2013 | Pimlott et al. | |
| 2014/0277750 A1* | 9/2014 | Artman | G05B 15/02 700/275 |
| 2014/0277818 A1 | 9/2014 | Peterson et al. | |
| 2015/0118017 A1 | 4/2015 | Yato | |
| 2016/0048142 A1* | 2/2016 | Chan | G05B 19/042 700/276 |
| 2017/0017280 A1* | 1/2017 | Nakanishi | G06F 1/20 |

OTHER PUBLICATIONS

Artman, et al., "Advanced Thermal Control: Optimizing across Environments and Power Goals", In White Paper of Dell, Feb. 2012, pp. 1-10.

"International Search Report and Written Opinion Issued in PCT Application No. PCT/US2017/031476", dated Jul. 20, 2017, 14 Pages.

* cited by examiner

Table 1: Temperature Difference Comparisons

| | Zone & Fan # | Sensor | Sensor Temp | Spec Temp | Margin/Gap | Increase Speed Fan #s |
|---|---|---|---|---|---|---|
| Scenario #1 | 1 | #1 | 94 | 100 | 6 | 3 |
| | 2 | #2 | 78 | 96 | 18 | |
| | 3 | #3a | 78 | 90 | 12 | |
| | | #3b | 58 | 60 | 2 | |
| | | #3n | 55 | 72 | 17 | |
| | | Least Margin | | | 2 | |

| | Zone & Fan # | Sensor | Sensor Temp | Spec Temp | Margin/Gap | Increase Speed Fan #s |
|---|---|---|---|---|---|---|
| Scenario #2 | 1 | #1 | 97 | 100 | 3 | 1 |
| | 2 | #2 | 78 | 96 | 18 | |
| | 3 | #3a | 78 | 90 | 12 | 3 |
| | | #3b | 57 | 60 | 3 | |
| | | #3n | 55 | 72 | 17 | |
| | | Least Margin | | | 3 | |

| | Zone & Fan # | Sensor | Sensor Temp | Spec Temp | Margin/Gap | Increase Speed Fan #s |
|---|---|---|---|---|---|---|
| Scenario #3 | 1 | #1 | 95 | 100 | 5 | 1 |
| | 2 | #2 | 91 | 96 | 5 | 2 |
| | 3 | #3a | 85 | 90 | 5 | 3 |
| | | #3b | 50 | 60 | 10 | |
| | | #3n | 67 | 72 | 5 | |
| | | Least Margin | | | 5 | |

FIG. 4

ADAPTIVE COOLING TECHNIQUES IN ELECTRONIC DEVICES

BRIEF DESCRIPTION OF THE DRAWINGS

For a more complete understanding of the disclosure, reference is made to the following detailed description and accompanying drawing figures, in which like reference numerals may be used to identify like elements in the figures.

FIG. 4 is a representation of Table 1, including comparisons between sensor temperature and spec temperature in different fan zones of an electric device.

Figure 1:
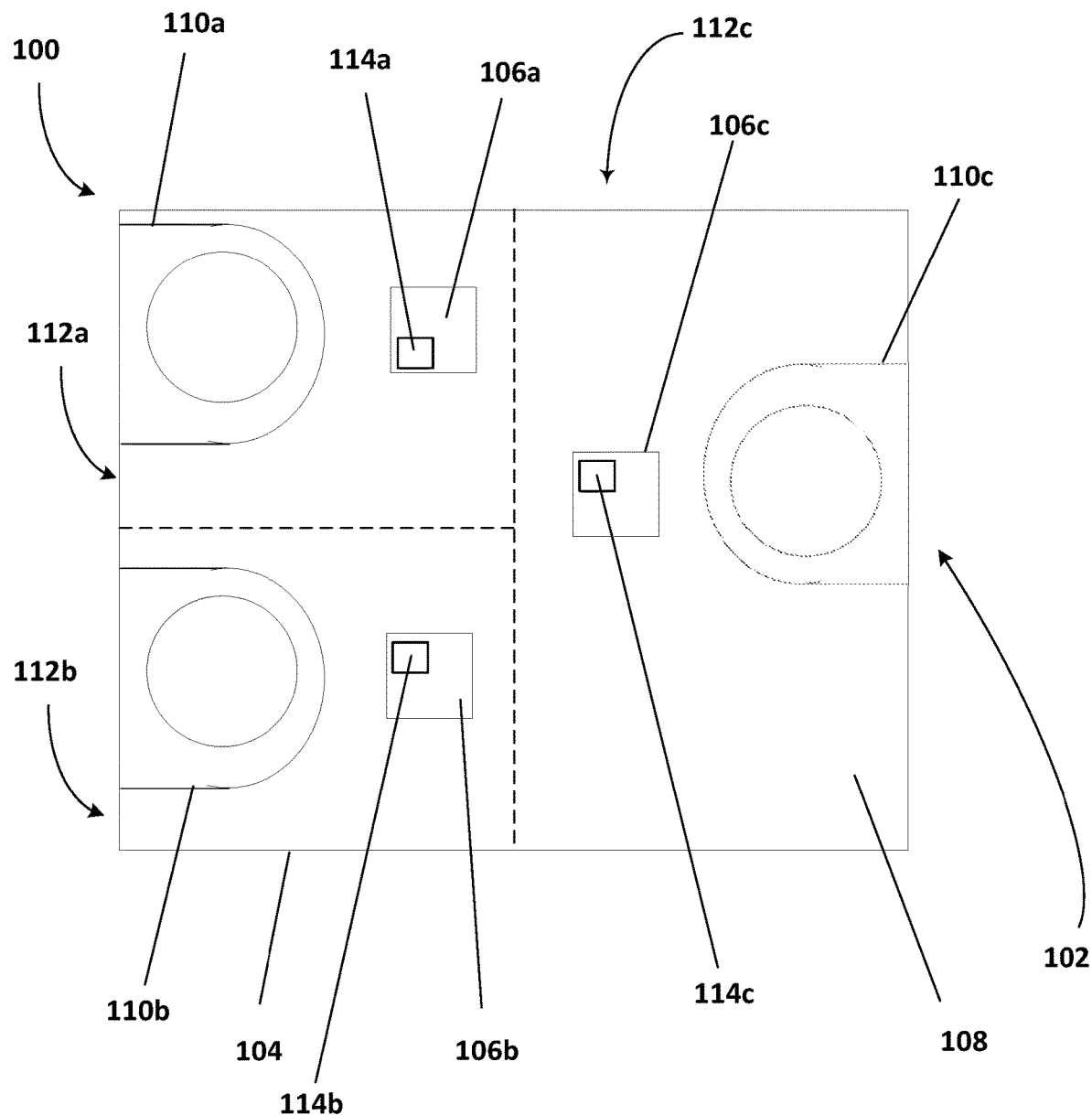
FIG. 1 depicts a top view of a computing device including an example of a thermal management system.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein

DETAILED DESCRIPTION

Current microprocessor design trends include designs having an increase in power, a decrease in size, and an increase in speed. This results in higher power in a smaller, faster microprocessor. Another trend is towards lightweight and compact electronic devices. As microprocessors become lighter, smaller, and more powerful, the microprocessors also generate more heat in a smaller space, making thermal management a greater concern than before.

The purpose of thermal management is to maintain the temperature of a device within a moderate range. During operation, electronic devices dissipate power as heat that is to be removed from the device. Otherwise, the electronic device will get hotter and hotter until the electronic device is unable to perform efficiently. When overheating, electronic devices run slowly and dissipate power poorly. This can lead to eventual device failure and reduced service life.

As computing devices get smaller (e.g., thinner), thermal management becomes more of an issue. Heat may be dissipated from a computing device using forced and natural convection, conduction, and radiation as a way of cooling the computing device as a whole and a processor operating within the computing device. For forced convection, a computing device may include a number of fans used to move air through the computing device and cool one or more heat generating components of the computing device.

Thermal management systems of the prior art may use sensors to track temperatures within the computing device (e.g., corresponding to components within the computing device) and increase a speed of one of the fans when a tracked temperature approaches a temperature limit of the corresponding component within the computing device. Higher fan speed results in more cooling and thus a lower temperature for the corresponding component and better system performance. However, the fan consumes more power when operating at the increased speed, and the increased fan speed creates a noisier thermal management system and thus a noisier computing device.

Disclosed herein are apparatuses, systems, and methods for controlling speeds of fans of a thermal management system using acoustic look-up tables to minimize acoustic levels during operation of the thermal management system, while also providing optimal thermal management. Cooling for the computing device may be divided into different zones. Each zone includes one or more sensors that track corresponding component temperatures and provide live closed-loop feedback to the thermal management system (e.g., a processor of the thermal management system). A fan may be assigned to a zone and may be responsible for cooling that zone.

The thermal management system receives component temperatures via sensors and firmware. The thermal management system then compares component temperatures to corresponding specifications (e.g., maximum operating temperatures) and ranks the comparisons. For example, the thermal management system identifies a first fan or a combination of first fans to address components with a least margin to specification. In other words, a fan speed will be increased to better cool a component of the computing device having an operating temperature that is closest to the specification for the component.

With the increased first fan speed identified, acoustic look-up tables are used to determine a best combination of fan speeds to minimize an acoustic level within the computing device. For example, the thermal management system uses the acoustic look-up tables to identify at least one fan, for which fan speed is to be decreased, to decrease the acoustic level within the computing device. The acoustic look-up tables may be stored in a memory, and the thermal management system may select an acoustic look-up table that corresponds to the increased first fan speed. The selected acoustic look-up table lists expected acoustic levels at different combinations of fan speed for a second fan and a third fan, respectively, with the first fan speed fixed. The fan for which speed is to be decreased may be identified based on an identification of which decrease in fan speed (e.g., the second fan or the third fan) would result in a lowest acoustic level for the thermal management system and/or the computing device.

The thermal management system controlled in this way provides optimal thermal management for the computing device while minimizing acoustics in the computing device. Optimal thermal management may provide an increase in system performance and an increase in computing device life expectancy.

As an example, the improved heat dissipation from a computing device may be implemented by a method for cooling an electronic device. The method includes measuring, by a plurality of sensors, temperatures within the electronic device, respectively. Each sensor of the plurality of sensors is associated with at least one fan of a plurality of fans. The method also includes determining, by a processor, for each sensor of the plurality of sensors, a difference between the measured temperature and a predetermined temperature corresponding to the sensor. The method includes comparing, by the processor, the determined differences, and increasing, by the processor, a speed of at least a first fan of the plurality of fans based on the comparison. The method also includes determining, by the processor, using an acoustic look-up table, which fan of the plurality of fans to decrease fan speed based on the increased speed of the first fan.

Such heat dissipation apparatuses or systems have several potential end-uses or applications, including any electronic device having an active cooling component (e.g., fan). For example, the heat dissipation apparatus may be incorporated into personal computers, server computers, tablet or other handheld computing devices, laptop or mobile computers, gaming devices, communications devices such as mobile phones, multiprocessor systems, microprocessor-based systems, set top boxes, programmable consumer electronics, network PCs, minicomputers, mainframe computers, or audio or video media players. In certain examples, the heat dissipation apparatus may be incorporated within a wearable electronic device, where the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

Using one or more of these features described in greater detail below, improved heat dissipation may be provided for the electronic device. With the improved heat dissipation feature, a more powerful microprocessor may be installed for the electronic device, a thinner electronic device may be designed, a higher processing speed may be provided, the electronic device may be operated at a higher power for a longer period of time, or any combination thereof may be provided when compared to a similar electronic device without one or more of the improved heat dissipation features. In other words, the heat dissipation features described herein may provide improved thermal management for an electronic device such as a mobile phone, tablet computer, or laptop computer.

FIG. 1 shows a top view of a computing device 100 including an example of a thermal management system 102. The computing device 100 may be any number of computing devices including, for example, a personal computer, a server computer, a tablet or other handheld computing device, a laptop or mobile computer, a communications device such as a mobile phone, a multiprocessor system, a microprocessor-based system, a set top box, a programmable consumer electronic device, a network PC, a minicomputer, a mainframe computer, or an audio and/or video media player.

The computing device 100 includes a housing 104 that supports at least the thermal management system 102 and one or more heat generating components 106. The one or more heat generating components 106 may be any number of electrically powered devices including, for example, a processor, memory, a power supply, a graphics card, a hard drive, or another electrically powered device. The one or more heat generating components 106 may be supported by the housing 104 via, for example, a printed circuit board (PCB) 108 attached to and/or supported by the housing 104. The one or more heat generating components 106 are in communication with each other and/or other electrical devices or components (e.g., fans) of the computing device 100 via the PCB 108, for example. The computing device 100 may include a number of components not shown in FIG. 1 (e.g., a hard drive, a power supply, connectors).

Three heat generating components 106 (e.g., first heat generating component 106a, second heat generating component 106b, and third heat generating component 106c) are shown in the example of FIG. 1. More or fewer heat generating components 106 may be included in the computing device. In one example, the heat generating component 106a is a processor, the heat generating component 106b is a graphics card, and the heat generating component 106c is a memory. In other examples, one or more of the heat generating components 106a, 106b, and 106c represent different components within the computing device 100 (e.g., a hard drive, a power supply, or another processor).

The thermal management system 102 includes one or more fans 110 to actively cool the one or more heat generating components 106, respectively, moving heat out of the computing device 100 via vents in the housing 104 of the computing device 100. The one or more fans 110 may be any number of different types of fans including, for example, an axial-flow fan, a centrifugal fan, a crossflow fan, or another type of fan. The one or more fans 110 may rotate on any number of types of bearings including, for example, sleeve bearings, rifle bearings, ball bearings, fluid bearings, magnetic bearings, or another type of bearing. The one or more fans 110 may be sized and may rotate at a speed based on the heat generating component 106 to be cooled (e.g., based on the heat generated by the heat generating component 106 to be cooled). Each of the one or more fans 110 may be the same type of fan, or different types of fans may be used.

In the example shown in FIG. 1, the thermal management system 102 includes three fans 110 (e.g., first fan 110a, second fan 110b, and third fan 110c) to cool the three heat generating components 106a, 106b, and 106c, respectively. The thermal management system 102 may include more or fewer fans 110. The thermal management system 102 may include additional components (e.g., heat sinks and/or phase change devices) to aid in the removal of heat from the computing device 100. For example, the thermal management system 102 may include phase change devices (e.g., heat pipes and/or vapor chambers) physically attached or adjacent to a respective heat generating component 106 and a respective fan 110.

The computing device 100 is divided into zones 112. Each fan of the one or more fans 110 is responsible for cooling a corresponding zone 112 (e.g., the zone 112 in which the fan 110 is positioned). The computing device 100 shown in the example of FIG. 1 includes three zones 112 (e.g., first zone 112a, second zone 112b, and third zone 112c). In other examples, the computing device 100 includes more, fewer, or different zones. In the example shown in FIG. 1, the first zone 112a includes the first heat generating component 106a, the second zone 112b includes the second heat generating component 106b, and the third zone 112c includes the third heat generating component 106c. The computing device 100 may be divided into the zones 112 based on locations of heat generating components 106 to be cooled, locations of fans 110, locations of peak temperatures during operation of the computing device 100 and/or based on other information. The assignment of the zones 112 may be fixed when the computing device 100 is manufactured, or the zones 112 may vary based on operating conditions (e.g., temperatures) within the computing device 100.

The thermal management system 102 also includes one or more sensors 114 that monitor temperatures within the zones 112, respectively. The one or more sensors 114 may be any number of different types of temperature sensors including, for example, a thermocouple, a resistance temperature detector (RTD) (e.g., a resistance wire RTD or a thermistor), or another type of temperature sensor. All of the one or more sensors 114 may be the same type of sensor, or different types of sensors may be used within the computing device 100.

As shown in the example of FIG. 1, the thermal management system 102 may include three sensors 114 (e.g., a first sensor 114a, a second sensor 114b, and a third sensor 114c). The first sensor 114a monitors a temperature within the first zone 112a, the second sensor 114b monitors a temperature within the second zone 112b, and the third sensor 114c monitors a temperature within the third zone 112c. For example, the first sensor 114a monitors an operating temperature of the first heat generating component 106a, the second sensor 114b monitors an operating temperature of the second heat generating component 106b, and the third sensor 114c monitors an operating temperature of the third heat generating component 106c. The first sensor 114a, the second sensor 114b, and the third sensor 114c are positioned on or adjacent to the first heat generating component 106a, the second heat generating component 106b, and the third heat generating component 106c, respectively. In one example, a sensor 114 monitors a temperature at a position within the computing device 100 not at or adjacent to one of the heat generating components. For example, the sensor 114 may monitor a temperature of a component of the thermal management system 102 (e.g., at a position on a phase change device such as a heat pipe). In one example, at least one of the zones 112 (e.g., the third zone 112c) includes a plurality of sensors 114 (e.g., the third sensor 114c and a fourth sensor). The plurality of sensors 114 in the one zone 112 respectively monitor the temperatures of a plurality of components and/or positions within the one zone 112.

All of the sensors 114 within the computing device 100 provide live closed-loop feedback to the thermal management system 102. For example, the thermal management system 102 includes a processor (e.g., one of the heat generating components 106 or another processor within or outside the computing device 100). Thermal management systems of the prior art may use sensors to track temperature and increase fan speed as soon as any component is approaching a limit. Increasing the fan speed based only on temperature limits may result in over cooling, which requires additional power than necessary and creates a noisier computing device. The processor 106a, for example, receives the live temperatures from the sensors 114a, 114b, and 114c and controls the fans 110a, 110b, and 110c based on the methods described below to avoid both under cooling, which reduces system performance and component life expectancy, and over cooling.

Figure 2:
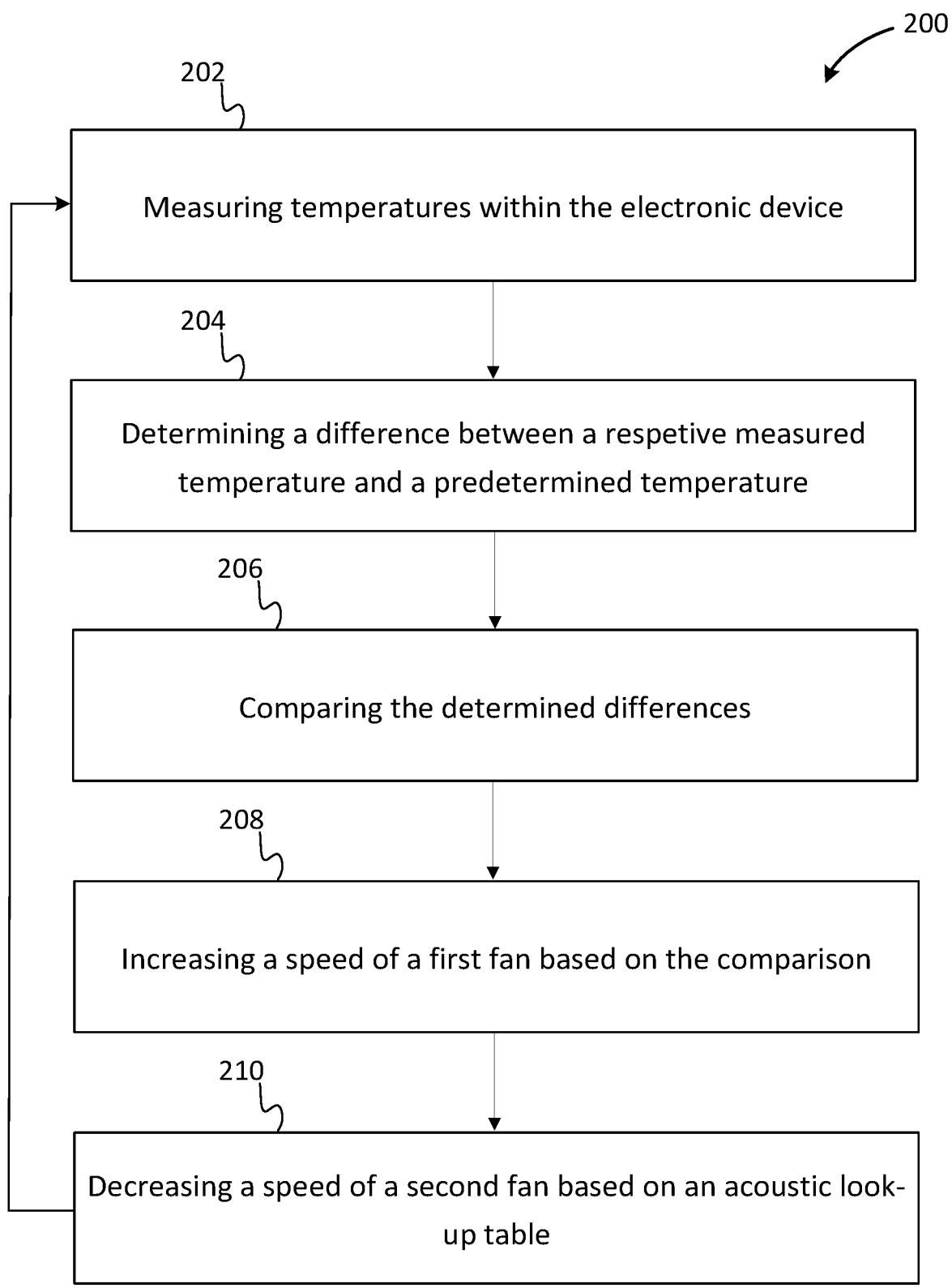
FIG. 2 is a flow diagram of a method for cooling an electronic device in accordance with one example.

FIG. 2 shows a flowchart of one example of a method 200 for cooling an electronic device. The computing device may be a computing device shown in FIGS. 1 and 3 or may be another computing device. The method 200 is implemented in the order shown, but other orders may be used. Additional, different, or fewer acts may be provided. Similar methods may be used for transferring heat.

In act 202, one or more sensors measure temperatures within an electronic device. The electronic device may be any number of electronic devices including, for example, a personal computer, a server computer, a tablet or other handheld computing device, a laptop or mobile computer, a communications device such as a mobile phone, a multi-processor system, a microprocessor-based system, a set top box, a programmable consumer electronic device, a network PC, a minicomputer, a mainframe computer, or an audio and/or video media player. The electronic device includes one or more heat generating devices to be cooled. For example, the one or more heat generating devices may be any number of electrically powered devices including, for example, a processor, memory, a power supply, a graphics card, a hard drive, or another electrically powered device.

The electronic device also includes one or more fans to actively cool the electronic device. The electronic device is divided into zones, and each of the one or more fans is responsible for cooling a respective zone. In other words, each fan of the one or more fans is assigned to a respective zone for cooling that zone. The zone may be defined by which heat generating component(s) are included within the zone. For example, the electronic device may include three heat generating devices to be actively cooled (e.g., a first heat generating device, a processor; a second heat generating device, a memory; and a third heat generating device, a graphics card). A first zone may include a first of the three heat generating devices, a second zone may include a second of the three heat generating devices, and a third zone may include a third of the heat generating devices. The electronic device may be divided into more or fewer zones. In one example, at least one of the zones includes more than one heat generating component to be actively cooled.

The zone assignments of the fans may be predetermined and may not change. Alternatively, the zone assignments of the fans may change based on the operating state of the electronic device. For example, during low power operation of the electronic device, the second heat generating device may not operate at a temperature near peak operating temperature. In such a scenario, the second heat generating device may be removed from the analysis below.

In one example, the one or more sensors include at least three sensors (e.g., a first sensor, a second sensor, and a third sensor), and the one or more heat generating devices includes the three heat generating devices. The electronic device is divided into three zones (e.g., a first zone, a second zone, and a third zone). Each of the three zones includes a respective one of the three heat generating devices. Each sensor of the three sensors is positioned at or adjacent to a respective one of the three heat generating devices. For example, the sensor physically contacts the respective heat generating device or physically contacts another component (e.g., a heat sink) in physical contact with the heat generating device. In another example, at least one of the three sensors is positioned at an expected hot spot of the electronic device and is not associated with a heat generating component (e.g., on a housing of the electronic device to monitor housing temperatures experienced by a user).

In one example, at least one of the heat generating devices is a processor. In another example, none of the heat generating devices is the processor (e.g., the processor is located outside the electronic device, and data is transmitted from/to the sensors to/from the processor via a wired and/or wireless connection). The processor may be configured by hardware, software, firmware, or any combination thereof.

In act 204, the processor determines differences between the measured temperatures and corresponding predetermined temperatures (e.g., specifications), respectively. The three sensors, for example, provide live temperature feedback (e.g., in degrees Celsius, Fahrenheit, or Kelvin) to the processor via a circuit board, a wired connection, a wireless connection, or any combination thereof. In one example, the processor may determine, for each sensor of the three sensors, a difference between the measured temperature and a corresponding predetermined temperature at a predetermined time interval. For example, the processor may determine the difference between the measured temperature and the corresponding predetermined temperature every microsecond, millisecond, or other intervals.

A memory (e.g., one of the heat generating devices) stores the predetermined temperatures. In one example, the predetermined temperatures are stored in firmware. The predetermined temperatures may represent maximum operating temperatures for the corresponding heat generating devices. In one example, at least one of the predetermined temperatures represents a maximum temperature for a position within the electronic device not associated with a heat generating device. For example, at least one of the predetermined temperatures represents a maximum allowable temperature on the housing of the electronic device to prevent burning a user of the electronic device.

In act 206, the processor compares the determined differences. For example, the processor ranks the differences determined in act 204 from least to greatest or greatest to least. In one example, the processor determines the smallest difference(s) without ranking all of the determined differences. FIG. 4 is a representation of Table 1 illustrating three examples of such comparisons.

In the example illustrated with Table 1 in FIG. 4, the first zone of the electronic device includes a first fan and a first sensor. The second zone of the electronic device includes a second fan and a second sensor. The third zone of the electronic device includes a third fan and at least three sensors (e.g., a third sensor (3a), a fourth sensor (3b), and a fifth sensor (3c)). Differences for more or fewer zones and corresponding fans and sensors may be compared.

As shown with scenario #1 (top table), at a first time during operation of the electronic device, the fourth sensor (e.g., sensor 3b) returns a measured temperature to the processor that is within two degrees of the corresponding predetermined temperature (e.g., spec temp). The fourth sensor and the corresponding predetermined temperature may be associated with any number of heat generating devices or positions within the electronic device including, for example, a processor, a memory, a graphics card, a hard drive, a power supply, a position within the electronic device (e.g., an expected hotspot on the housing of the electronic device), or another heat generating device. Compared to all of the other calculated differences, the difference calculated for the fourth sensor is the smallest difference.

As shown with scenario #2 (middle table), at a second time during operation of the electronic device, the first sensor and the fourth sensor return measured temperatures to the processor that are within three degrees of the respective predetermined temperatures, respectively. The first sensor and the corresponding predetermined temperature may be associated with any number of heat generating devices or positions within the electronic device including, for example, the processor. Compared to all of the other calculated differences, the differences calculated for the first sensor and the fourth sensor, respectively, are the smallest differences.

As shown with scenario #3 (bottom table), at a third time during operation of the electronic device, the first sensor, the second sensor, the third sensor (e.g., sensor 3a), and the fifth sensor (e.g., sensor 3c) return measured temperatures to the processor that are within five degrees of the predetermined temperatures, respectively. The second sensor and the corresponding predetermined temperature may be associated with any number of heat generating devices or positions within the electronic device including, for example, the memory. The third sensor and the corresponding predetermined temperature may be associated with any number of heat generating devices or positions within the electronic device including, for example, the graphics card. The fifth sensor and the corresponding predetermined temperature may be associated with any number of heat generating devices or positions within the electronic device including, for example, a processor, a memory, a graphics card, a hard drive, a power supply, a position within the electronic device (e.g., an expected hotspot on the housing of the electronic device), or another heat generating device. Compared to all of the other calculated differences, the differences calculated for the first sensor, the second sensor, the third sensor, and the fifth sensor, are the smallest differences.

In act 208, the processor increases a speed of at least one fan of the electronic device based on the comparison. The processor increases the speed of the fan(s) with the least difference determined in act 204. For example, as shown in Table 1, the speed of the third fan is increased in scenario #1, the speeds of the first fan and the third fan, respectively, are increased in scenario #2, and the speeds of the first fan, the second fan, and the third fan, respectively, are increased in scenario #3. The speed of the first fan, the speed of the second fan, the speed of the third fan speed, or any combination thereof, depending on results of the comparison in act 206, may be increased predetermined amounts, respectively. In one example, the speed of a fan is only increased if the corresponding calculated difference is less than or less than and equal to a predetermined threshold. Using the example illustrated in Table 1, the predetermined threshold may be three degrees Fahrenheit. Using Scenario #3 as an example, none of the fan speeds would be increased until a calculated difference was less than or equal to three degrees Fahrenheit. In other words, fan speed is not increased until system performance is affected. The predetermined threshold may be present or may be changeable by a user. In an example where no fan speeds are increased, the method may continue on to act 210.

In scenarios where more than one fan speed is to be increased (e.g., scenario #3 in Table 1), the speed of the first fan, the speed of the second fan, and the speed of the third fan, for example, may be increased the same amount or different amounts. The amounts fan speeds are to be increased may be set based on a predetermined amount, fan size, distance between the fan and the corresponding heat generating device to be cooled, the type of fan, other specifications, or any combination thereof. As an example, the speed of the first fan, the speed of the second fan, and the speed of the third fan may each be increased by 500 revolutions per minute (RPMs) when the respective fan is identified in act 206. Greater or lesser increases in fan speed may be provided. In one example, the increase in speed is dependent on the difference calculated in act 204. For example, the smaller the difference calculated in act 204, the greater the increase in fan speed is.

In act 210, the processor decreases a speed of another fan of the electronic device based on an acoustic look-up table. The memory stores a plurality of acoustic look-up tables including noise levels at different speeds of different fans of the electronic device. For example, the processor may select an acoustic look-up table from the plurality of acoustic look-up tables based on the increased speed from act 208. The plurality of acoustic look-up tables may be generated experimentally or with modeling.

For example, the speed of the first fan may be increased to 4,000 RPMs in act 208, and the processor may select an acoustic look-up table from the plurality of acoustic look-up tables stored in the memory based on the speed of first fan of 4,000 RPMs. In an example where the electronic device only includes three fans, only one acoustic look-up table of the plurality of acoustic look-up tables corresponds to a first fan speed of 4,000 RPMs (e.g., with varying fan speeds for the second fan and the third fan). For electronic devices including more than three fans, a number of acoustic look-up tables correspond to a first fan speed of 4,000 RPMs. For such an electronic device, different acoustic look-up tables including noise levels for different combinations of fans may be stored in the memory. For example, for an electronic device including four fans, three different acoustic look-up tables corresponding to a first fan speed of 4,000 RPMs are store in the memory (e.g., a first acoustic look-up table including noise levels for different combinations of fan speeds for the second fan and the third fan, respectively, a second acoustic look-up table including noise levels for different combinations of fan speeds for the third fan and a fourth fan, respectively, and a third acoustic look-up table including noise levels for different combinations of fan speeds for the second fan and the fourth fan, respectively). The acoustic look-up table may be selected from the first acoustic look-up table, the second acoustic look-up table, and the third acoustic look-up table, for example, based on distance of the fans represented within the acoustic look-up table (e.g., the second fan and the third fan) to the fan for which fan speed is increased in act 208 (e.g., the first fan). Alternatively, the acoustic look-up table may be selected from the first acoustic look-up table, the second acoustic look-up table, and the third acoustic look-up table, for example, based on the sensors and the corresponding fans for which the greatest temperature differences are calculated in act 206. In yet another example, the acoustic look-up table may be selected from the first acoustic look-up table, the second acoustic look-up table, and the third acoustic look-up table, for example, based on which fans most greatly affect noise during operation of the electronic device.

Table 2 below illustrates an example of an acoustic look-up table that may be selected in act 210.

TABLE 2

Example Look-Up Table

| First Fan | Second Fan Speed (RPMs) | | | | | | | |
|---|---|---|---|---|---|---|---|---|
| Speed - 4,000 RPMs | 0 | 1000 | 1500 | 2000 | 2500 | 3000 | 3500 | 4000 |
| Third Fan Speed (RPMs)  0 | 20.62 | 20.90 | 21.10 | 21.89 | 23.57 | 26.02 | 29.36 | 30.91 |
| 1000 | 20.56 | 20.71 | 21.28 | 22.33 | 23.85 | 26.35 | 29.27 | 30.72 |
| 1500 | 21.25 | 21.20 | 21.60 | 22.43 | 23.59 | 25.67 | 29.73 | 30.47 |
| 2000 | 23.37 | 23.21 | 23.52 | 24.05 | 24.81 | 26.29 | 30.08 | 31.10 |
| 2500 | 28.43 | 28.34 | 28.43 | 28.78 | 28.96 | 29.54 | 32.02 | 32.50 |
| 3000 | 32.55 | 32.89 | 32.95 | 33.12 | 33.18 | 33.44 | 34.71 | 35.06 |
| 3500 | 36.06 | 36.06 | 36.01 | 36.16 | 36.20 | 36.43 | 37.18 | 37.27 |

The processor may decrease a fan speed (e.g., of the second fan or the third fan) based on the selected look-up table. For example, the processor may work across the look-up table until the difference determined for the first sensor, for example, in act 204 is no longer the smallest difference. The processor may decrease fan speed for a fan that most greatly affects a noise level with the electronic device.

In the example shown in Table 2, if the speed of the first fan has been increased to 4,000 RPMs in act 208, the speed of the second fan is 4,000 RPMs, and the speed of the third fan is 3,500 RPMs, the processor may decrease the speed of the third fan in act 210 because the speed of the third fan has a larger affect on the noise level within the electronic device than the second fan (e.g., 2.21 change in dB level within the electronic device compared to a 0.09 change in dB level, respectively, when the speed of the fan is reduced 500 RPMs). The speed of the third fan, for example, may be decreased by the speed interval shown in Table 2 (e.g., 500 RPMs) or may be decreased by a different amount (e.g., 100 RPMs). The processor may continue to decrease the fan speed of the third fan, for example, until a decrease in speed for the second fan has a greater affect on the noise level within the electronic device compared to the same decrease in speed for the third fan, according to the selected look-up table, or until the difference determined for the first sensor, for example, in act 204 is no longer the smallest difference. In another example, the fan for which speed is decreased alternates between the two fans included in the selected look-up table. For example, the speed of the third fan is decreased by 500 RPMs, then the speed of the second fan is decreased by 500 RPMs, and then the speed of the third fan is decreased by 500 RPMs.

After act 210, the method may return to act 202. The method may be a closed loop in that a thermal management system of the electronic device is continuously monitoring or monitoring at a predetermined interval heat generating components within the electronic device.

The examples of the method described with reference to FIG. 2 may provide optimal thermal management while minimizing system acoustics in electronic devices. Optimal thermal management may provide an increase in system performance, an increase in system and/or device life expectancy, and an improved financial margin.

Figure 3:
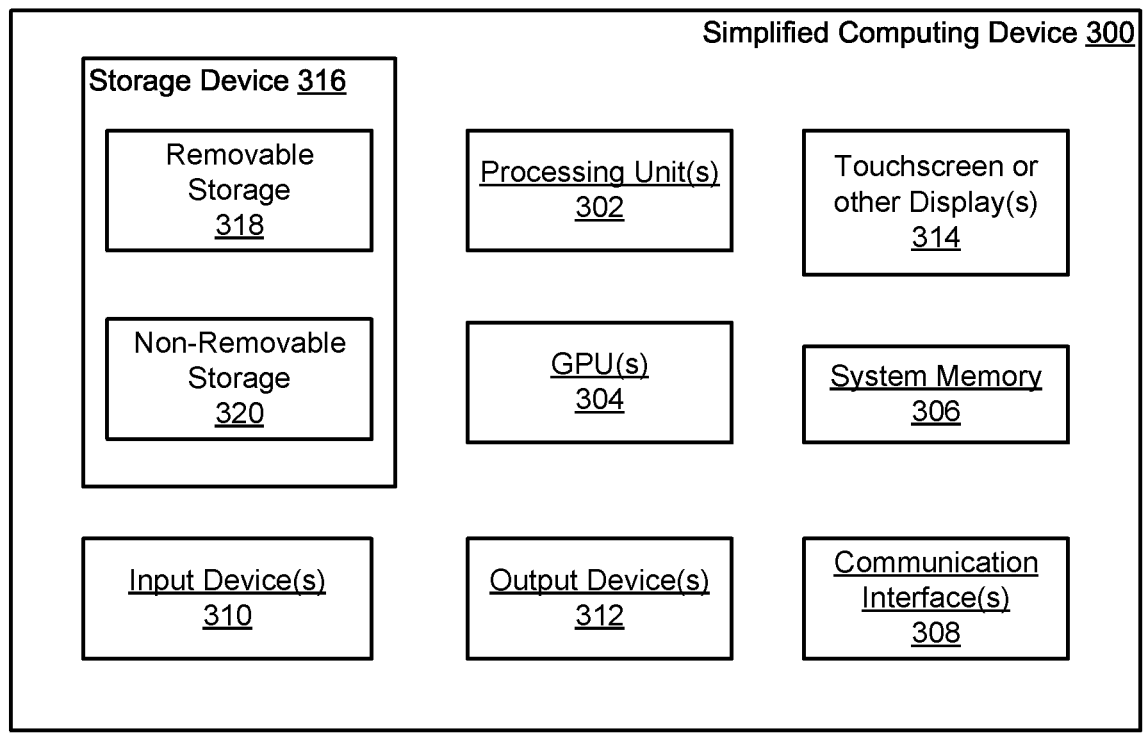
FIG. 3 is a block diagram of a computing environment in accordance with one example for implementation of the disclosed methods or one or more electronic devices.

With reference to FIG. 3, a thermal management system, as described above, may be incorporated within an exemplary computing environment 300. The computing environment 300 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. For example, the heat dissipating apparatus is incorporated within a computing environment having an active cooling source (e.g., fans).

The computing environment 300 has sufficient computational capability and system memory to enable basic computational operations. In this example, the computing environment 300 includes one or more processing units 302, which may be individually or collectively referred to herein as a processor. The computing environment 300 may also include one or more graphics processing units (GPUs) 304. The processor 302 and/or the GPU 304 may include integrated memory and/or be in communication with system memory 306. The processor 302 and/or the GPU 304 may be a specialized microprocessor, such as a digital signal processor (DSP), a very long instruction word (VLIW) processor, or other microcontroller, or may be a general purpose central processing unit (CPU) having one or more processing cores. The processor 302, the GPU 304, the system memory 306, and/or any other components of the computing environment 300 may be packaged or otherwise integrated as a system on a chip (SoC), application-specific integrated circuit (ASIC), or other integrated circuit or system.

The computing environment 300 may also include other components, such as, for example, a communications interface 308. One or more computer input devices 310 (e.g., pointing devices, keyboards, audio input devices, video input devices, haptic input devices, or devices for receiving wired or wireless data transmissions) may be provided. The input devices 310 may include one or more touch-sensitive surfaces, such as track pads. Various output devices 312, including touchscreen or touch-sensitive display(s) 314, may also be provided. The output devices 312 may include a variety of different audio output devices, video output devices, and/or devices for transmitting wired or wireless data transmissions.

The computing environment 300 may also include a variety of computer readable media for storage of information such as computer-readable or computer-executable instructions, data structures, program modules, or other data. Computer readable media may be any available media accessible via storage devices 316 and includes both volatile and nonvolatile media, whether in removable storage 318 and/or non-removable storage 320. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the processing units of the computing environment 300.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

In a first embodiment, a computing device includes a plurality of fans and a plurality of sensors. Each sensor of the plurality of sensors is associated with at least one fan of the plurality of fans and is operable to determine a temperature. The computing device also includes a processor in communication with the plurality of fans and the plurality of sensors. The processor is configured to determine, for each sensor of the plurality of sensors, a difference between the determined temperature and a predetermined temperature corresponding to the sensor. The processor is also configured to compare the determined differences, increase a speed of at least a first fan of the plurality of fans based on the comparison, and determine which fan of the plurality of fans to decrease fan speed based on the increased speed of the first fan.

In a second embodiment, with reference to the first embodiment, the computing device further includes a memory in communication with the processor. The memory is configured to store at least one acoustic look-up table.

In a third embodiment, with reference to the second embodiment, the processor is configured to decrease the speed of the determined fan based on a stored acoustic look-up table of the at least one acoustic look-up table.

In a fourth embodiment, with reference to the second embodiment, the processor is configured to determine which fan of the plurality of fans to decrease fan speed based on a stored acoustic look-up table of the at least one acoustic look-up table.

In a fifth embodiment, with reference to the fourth embodiment, the at least one acoustic look-up table includes a plurality of acoustic look-up tables. The processor is configured to select the acoustic look-up table from the plurality of acoustic look-up tables based on the increased speed of the first fan.

In a sixth embodiment, with reference to the fifth embodiment, the selected acoustic look-up table includes a plurality of expected sound levels at a plurality of combinations of a speed of a second fan of the plurality of fans and a speed of a third fan of the plurality of fans, respectively, when the first fan is operated at the increased speed.

In a seventh embodiment, with reference to the sixth embodiment, the processor is configured to determine which fan of the plurality of fans to decrease fan speed based on which fan of the second fan and the third fan will decrease acoustic sound level the most after same decreases in speed.

In an eighth embodiment, with reference to the first embodiment, each sensor of the plurality of sensors is operable to measure an operating temperature of a component within the computing device. The predetermined temperature corresponding to the sensor is a maximum operating temperature for the component.

In a ninth embodiment, with reference to the first embodiment, the processor is configured to increase the speed of the first fan by a predetermined amount when the difference determined for the sensor associated with the first fan is a smallest difference of the compared differences.

In a tenth embodiment, a method for cooling an electronic device includes measuring, by a plurality of sensors, temperatures within the electronic device, respectively. Each sensor of the plurality of sensors is associated with at least one fan of a plurality of fans. The method also includes determining, by a processor, for each sensor of the plurality of sensors, a difference between the measured temperature and a predetermined temperature corresponding to the sensor. The method includes comparing, by the processor, the determined differences, and increasing, by the processor, a speed of at least a first fan of the plurality of fans based on the comparison. The method includes determining, by the processor, using an acoustic look-up table, which fan of the plurality of fans to decrease fan speed based on the increased speed of the first fan.

In an eleventh embodiment, with reference to the tenth embodiment, the method further includes storing, by a memory, in communication with the processor, a plurality of acoustic look-up tables. The plurality of acoustic look-up tables include the acoustic look-up table. The method also includes selecting, by the processor, the acoustic look-up table from the plurality of acoustic look-up tables based on the increased speed of the first fan.

In a twelfth embodiment, with reference to the eleventh embodiment, the selected acoustic look-up table includes a plurality of expected sound levels at a plurality of combinations of a speed of a second fan of the plurality of fans and a speed of a third fan of the plurality of fans, respectively, when the first fan is operated at the increased speed.

In a thirteenth embodiment, with reference to the twelfth embodiment, the method further includes determining, by the processor, which fan of the plurality of fans to decrease fan speed based on which fan of the second fan and the third fan will decrease acoustic sound level the most after same decreases in speed.

In a fourteenth embodiment, with reference to the tenth embodiment, the measuring includes measuring, by each sensor of the plurality of sensors, an operating temperature of a component within the computing device. The predetermined temperature corresponding to the sensor is a maximum operating temperature for the component.

In a fifteenth embodiment, with reference to the tenth embodiment, the increasing includes increasing, by the processor, the speed of the first fan by a predetermined amount when the difference determined for the sensor associated with the first fan is a smallest difference of the compared differences.

In a sixteenth embodiment, a system includes a computing device. The computing device includes a first fan, a second fan, and a third fan. The computing device also includes a first sensor associated with the first fan, a second sensor associated with the second fan, and a third sensor associated with the third fan. Each sensor of the first sensor, the second sensor, and the third sensor is operable to determine a respective temperature. The system also includes a processor in communication with the first fan, the second fan, the third fan, the first sensor, the second sensor, and the third sensor. The processor is configured to determine, for each sensor of the first sensor, the second sensor, and the third sensor, a difference between the determined temperature and a predetermined temperature corresponding to the sensor. The processor is also configured to compare the determined differences, and increase a speed of the first fan when the determined difference for the first sensor is a smallest difference of the determined differences. The processor is configured to determine, using an acoustic look-up table, which fan of the second fan and the third fan to decrease fan speed based on the increased speed of the first fan.

In a seventeenth embodiment, with reference to the sixteenth embodiment, the computing device further includes the processor.

In an eighteenth embodiment, with reference to the sixteenth embodiment, the system further includes a memory in communication with the processor. The memory is configured to store the acoustic look-up table.

In a nineteenth embodiment, with reference to the sixteenth embodiment, each sensor of the first sensor, the second sensor, and the third sensor is operable to measure an operating temperature of a component or a portion within the computing device. The predetermined temperature corresponding to the sensor is a maximum operating temperature for the component or the portion within the computing device.

In a twentieth embodiment, with reference to the sixteenth embodiment, the processor is configured to increase the speed of the first fan by a predetermined amount when the difference determined for the sensor associated with the first fan is a smallest difference of the compared differences.

In connection with any one of the aforementioned embodiments, the thermal management device or the method for manufacturing the thermal management device may alternatively or additionally include any combination of one or more of the previous embodiments.

The foregoing description is given for clearness of understanding only, and no unnecessary limitations should be understood therefrom, as modifications within the scope of the claims may be apparent to those having ordinary skill in the art.

The invention claimed is:

1. A computing device comprising:
   a plurality of fans including a first fan and a second fan;
   a plurality of temperature sensors; and
   a processor in communication with the plurality of fans and the plurality of temperature sensors and a memory in communication with the processor, the processor being configured to:
      obtain first temperature information associated with the first fan, the first temperature information including:
         a measured temperature from a first temperature sensor of the plurality of temperature sensors; and
         a preset temperature threshold corresponding to the first temperature sensor;
      obtain second temperature information associated with the second fan, the second temperature information including:
         a measured temperature from a second temperature sensor of the plurality of temperature sensors; and
         a preset temperature threshold corresponding to the second temperature sensor;
      identify a target fan by comparing the first temperature information with the second temperature information;
      in accordance with identification of the first fan as the target fan:
         increase a speed of the first fan; and
         decrease a speed of the second fan based on the increased speed of the first fan and the second temperature information so as to reduce an acoustic level of the computing device.

2. The computing device of claim 1, the memory configured to store at least one acoustic look-up table.

3. The computing device of claim 2, wherein the processor is configured to decrease the speed of the second fan based on a stored acoustic look-up table of the at least one acoustic look-up table.

4. The computing device of claim 3, wherein the at least one acoustic look-up table comprises a plurality of acoustic look-up tables, and
   wherein the processor is configured to select the acoustic look-up table from the plurality of acoustic look-up tables based on the increased speed of the first fan.

5. The computing device of claim 4, wherein the selected acoustic look-up table comprises a plurality of expected sound levels at a plurality of combinations of a speed of a second fan of the plurality of fans and a speed of a third fan of the plurality of fans, respectively, when the first fan is operated at the increased speed.

6. The computing device of claim 5, wherein the processor is configured to determine which fan of the plurality of fans to decrease fan speed based on which fan of the second fan and the third fan will decrease acoustic sound level the most after same decreases in speed.

7. The computing device of claim 2, wherein the processor is configured to identify the target fan based on a stored acoustic look-up table of the at least one acoustic look-up table.

8. The computing device of claim 1, wherein each temperature sensor of the plurality of temperature sensors is operable to measure an operating temperature of a component within the computing device, wherein the first temperature or the second temperature corresponding to the temperature sensor is a maximum operating temperature for the component; and wherein the preset temperature threshold corresponding to the first temperature sensor is associated with a maximum operating temperature.

9. The computing device of claim 1, further comprising determining a difference value for the temperature sensor associated with the first fan, wherein the processor is configured to increase the speed of the first fan by a predetermined amount when the difference value is determined for the temperature sensor associated with the first fan is a smallest difference value of the difference values.

10. A method for cooling an electronic device having a first fan and a second fan, comprising:
 obtaining temperature information for each of the first and second fans, including:
  measuring a plurality of temperatures within the electronic device each temperature of the plurality of temperatures associated with at least one fan of the first and second fans;
  obtaining a preset temperature threshold corresponding to each temperature of the plurality of temperatures;
 identifying a target fan by comparing the obtained temperature information for the first and second fans;
 in accordance with identification of a first fan as the target fan:
  increasing a speed of the first fan; and
  decreasing a speed of the second fan based on the increased speed of the first fan and the obtained temperature information for the second fan.

11. The method of claim 10, further comprising:
 storing, by a memory in communication with a processor, a plurality of acoustic look-up tables; and
 selecting, by the processor, the acoustic look-up table from the plurality of acoustic look-up tables based on the increased speed of the first fan.

12. The method of claim 11, wherein selecting, by the processor, an acoustic look-up table comprises selecting a plurality of expected sound levels at a plurality of combinations of a speed of a second fan of the plurality of fans and a speed of a third fan of the plurality of fans, respectively, when the first fan is operated at the increased speed.

13. The method of claim 12, further comprising determining, by a processor, which fan of the plurality of fans to decrease fan speed based on which fan of the second fan and the third fan will decrease acoustic sound level the most after same decreases in speed.

14. The method of claim 10, further comprising determining, by a processor, for each sensor of a plurality of sensors, a difference value between the measured temperature and a predetermined temperature corresponding to each sensor of the plurality of sensors resulting in a first determined difference value for a first sensor of the plurality of sensors and a second determined difference value for a second sensor of the plurality of sensors, wherein the measuring comprises measuring, by each sensor of a plurality of sensors, an operating temperature of a component within a computing device, wherein the measured temperatures for each sensor of the plurality of sensors corresponds to an operating temperature of a component within the computing device, and wherein the predetermined temperature corresponding to the sensor is a maximum operating temperature for the component.

15. The method of claim 10, further comprising determining a difference value for a temperature sensor associated with the first fan, wherein the increasing comprises increasing, by a processor, the speed of the first fan by a predetermined amount when the difference value determined for the temperature sensor associated with the first fan is a smallest difference value of the difference values.

16. A computing device comprising:
 a first fan, a second fan, and a third fan;
 a first temperature sensor associated with the first fan, a second temperature sensor associated with the second fan, and a third temperature sensor associated with the third fan; and
 a processor in communication with the first, second, and third fans, the first, second, and third sensors, the processor configured to:
  obtain temperature information for each of the first fan, the second fan, and the third fan, wherein the temperature information includes temperature measurements from the first, second, and third temperature sensors;
  identify a target fan by comparing the temperature information for the first fan, the second fan, and the third fan; and;
  in accordance with identification of the first fan as the target fan:
   increase a speed of the first fan;
   identify a second target fan based on the obtained temperature information for the second fan and the third fan and acoustic information for the second fan and the third fan; and
   in accordance with identification of the second fan as the second target fan, decrease a speed of the second fan based on the increased speed of the first fan.

17. The computing device of claim 16, further comprising a memory in communication with the processor, the memory configured to store an acoustic look-up table.

18. The computing device of claim 16, wherein each sensor of the first temperature sensor, the second temperature sensor, and the third temperature sensor is operable to measure an operating temperature of a component or a portion within the computing device, and wherein a predetermined temperature corresponding to the sensor is a maximum operating temperature for the component or the portion within the computing device.

19. The computing device of claim 16, wherein the processor is configured to increase the speed of the first fan by a predetermined amount when the difference value determined for the sensor associated with the first fan is a smallest difference value of the difference values.

* * * * *